US012688482B1

(12) United States Patent

Aldahwi

(10) Patent No.: US 12,688,482 B1
(45) Date of Patent: Jul. 21, 2026

(54) AUTHENTICATED SELF-DELIVERY AND ENERGY-AWARE DISPATCH FOR RENTING AUTONOMOUS SERVICE ROBOTS

(71) Applicant: Samara Aldahwi, Los Angeles, CA (US)

(72) Inventor: Samara Aldahwi, Los Angeles, CA (US)

( * ) Notice: Subject to any disclaimer, the term of this patent is extended or adjusted under 35 U.S.C. 154(b) by 0 days.

(21) Appl. No.: 19/323,186

(22) Filed: Sep. 9, 2025

(51) Int. Cl.
| | |
|---|---|
| G06Q 10/0834 | (2023.01) |
| G01C 21/20 | (2006.01) |
| G05D 1/648 | (2024.01) |
| G05D 1/661 | (2024.01) |
| G05D 105/28 | (2024.01) |
| G06Q 10/0631 | (2023.01) |
| H04L 9/40 | (2022.01) |
| G10L 15/22 | (2006.01) |

(52) U.S. Cl.
CPC ....... *G06Q 10/0834* (2013.01); *G01C 21/206* (2013.01); *G05D 1/648* (2024.01); *G05D 1/661* (2024.01); *G06Q 10/06315* (2013.01); *H04L 63/0846* (2013.01); *G05D 2105/28* (2024.01); *G10L 15/22* (2013.01)

(58) Field of Classification Search
None
See application file for complete search history.

(56) References Cited

U.S. PATENT DOCUMENTS

| | | | | |
|---|---|---|---|---|
| 9,646,283 | B2 * | 5/2017 | Kantor | G08G 5/32 |
| 10,345,818 | B2 * | 7/2019 | Sibley | B25J 9/1694 |
| 11,360,757 | B1 * | 6/2022 | Roy | H04L 67/06 |
| 12,352,976 | B1 * | 7/2025 | Oskui | H04R 1/403 |
| 2019/0180237 | A1 * | 6/2019 | Mattingly | G05D 1/104 |
| 2019/0287062 | A1 * | 9/2019 | Skaaksrud | G05D 1/0011 |
| 2020/0130510 | A1 * | 4/2020 | Eck | B60L 53/14 |

(Continued)

OTHER PUBLICATIONS

Freda, Luigi, et al. "3D multi-robot patrolling with a two-level coordination strategy." Autonomous Robots 43.7 (2019): 1747-1779. (Year: 2019).*

(Continued)

*Primary Examiner* — Sara Grace Brown
(74) *Attorney, Agent, or Firm* — IP Consulting Group; Michael Razavi; Alfred F. Hoyte

(57) ABSTRACT

A server-coordinated, authenticated self-delivery system for renting autonomous service robots is disclosed. A server receives a task request, computes an energy-feasible self-delivery and return plan that enforces a travel radius and reserve margin, and assigns a robot only if a total power budget condition is met. The server generates a time-limited activation token bound to a nonce and a per-robot secret and derives a human-enterable short code. The robot navigates under its own power to the service location using onboard mapping and path-planning, verifies the short code or a biometric factor locally, enables a hardware activation gate only upon successful verification, performs the task, cryptographically erases transient user data, optionally seals tamper-evident evidence for insurance, and returns under its own locomotion to a station. The approach improves robot handoff security, reduces energy-related delivery failures, and provides privacy-scoped sensing with signed audit logs.

20 Claims, 2 Drawing Sheets

(56) References Cited

U.S. PATENT DOCUMENTS

| | | | |
|---|---|---|---|
| 2020/0364351 A1* | 11/2020 | Sanchez | G06F 21/6218 |
| 2021/0144517 A1* | 5/2021 | Guim Bernat | G06F 9/5072 |
| 2021/0256465 A1* | 8/2021 | Väin | G06Q 10/08355 |
| 2021/0336797 A1* | 10/2021 | Van Duren | H04L 9/0825 |
| 2022/0050473 A1* | 2/2022 | Pärnpuu | G05D 1/0246 |
| 2023/0004933 A1* | 1/2023 | Heinla | G06Q 10/0833 |
| 2023/0144456 A1* | 5/2023 | Ferguson | G06Q 20/401 |
| | | | 705/26.81 |
| 2023/0377470 A1* | 11/2023 | Zhou | G08G 5/55 |
| 2024/0111291 A1* | 4/2024 | Horowitz | G05D 1/249 |
| 2025/0259085 A1* | 8/2025 | Crabtree | G06N 5/01 |
| 2025/0269276 A1* | 8/2025 | Gaither | A63F 13/355 |

OTHER PUBLICATIONS

Lin, Huei-Yung, and Jia-Rong Zhan. "GNSS-denied UAV indoor navigation with UWB incorporated visual inertial odometry." Measurement 206 (2023): 112256. (Year: 2023).*

* cited by examiner

10

22

24

26    26    26

21    21    21    21

20

AUTHENTICATED SELF-DELIVERY AND ENERGY-AWARE DISPATCH FOR RENTING AUTONOMOUS SERVICE ROBOTS

FIELD OF INVENTION

This disclosure relates to autonomous and semi-autonomous mobile robotics, networked control of distributed robotic fleets, and secure human-robot handoff. More particularly, it concerns systems, methods, and robotic apparatus that enable a robot to self-deliver to and from a workspace using an energy-feasible route, to mutually authenticate with a local user before enabling actuators, to execute assigned tasks, and to perform privacy-scoped sensing with post-task cryptographic erasure, all coordinated by a server that manages assignment and return.

BACKGROUND

Consumer and light-industrial robots are increasingly capable of performing domestic and service tasks, yet acquisition cost and utilization patterns make ownership inefficient for many users. Existing "robot as a service" or warehouse fleet managers dispatch robots inside controlled environments; vehicle-rental systems authenticate renters to a car; and service-robot assessments consider privacy. None of these, however, describe or enable an end-to-end architecture in which a general-purpose service robot can (i) decide whether it can self-deliver under its own locomotion to a borrower's location based on a verifiable power budget, (ii) perform a cryptographically bound, device-level handoff that gates actuator power until a challenge-response succeeds, and (iii) create a local, tamper-evident evidence package for insurance evaluation while still guaranteeing user privacy by default erasure after completion and time-limited retention.

Warehouse job managers, for example, assume indoor mapped spaces and omit consumer-side authentication at the robot. Vehicle rental stacks authenticate a human to a vehicle, but vehicles do not walk; they do not gate a manipulator's enable line on a challenge derived from a server nonce; and they do not reason about a two-leg trip energy budget for a mobile robot that must traverse sidewalks, elevators, and indoor obstacles. What is needed is a concrete control and data path that integrates (a) an energy-aware dispatch decision with an autonomous navigation stack, (b) a mutual attestation and activation gate at the robot, and (c) privacy-scoped sensing tied to a tamper-evident claim artifact-together yielding a practical, technological solution for safely renting robots.

SUMMARY

In one aspect, a system includes a server and at least one autonomous, self-mobile robotic unit. The server receives a task request from a user device, computes an energy-feasible self-delivery and return plan subject to battery state, terrain class, travel radius, reserve margin, and expected task energy, and assigns a particular robot only if a total power budget condition is satisfied. The server generates a time-limited activation token computed from a server nonce and a per-robot secret, and transmits a challenge to the robot. The robot navigates under its own locomotion to the user's location by executing a path plan generated by its onboard navigation module. Upon arrival, the robot performs a mutual authentication handshake with the user via a code and/or biometric factor; only after successful verification does a hardware activation gate enable actuators for the task. After completion, the robot cryptographically erases transient user data, persists only a signed audit log, and returns to base under its own locomotion along an energy-feasible route.

In another aspect, a method executed by the server and robotic unit implements an authenticated self-delivery and handoff protocol that reduces failed visits, prevents unauthorized use by gating actuators until proof of possession is verified at the device, and improves safety by enforcing an energy reserve and geofenced route compliance. In still another aspect, a non-transitory computer-readable medium stores instructions that, when executed by processors of the server and robot, perform the foregoing.

These techniques provide a concrete technological improvement: fewer delivery failures due to energy depletion; prevention of actuator enablement in the absence of mutual authentication; and privacy-scoped sensing with a cryptographically bound, tamper-evident evidence package for optional insurance adjudication.

DETAILED DESCRIPTION

Figure 1:
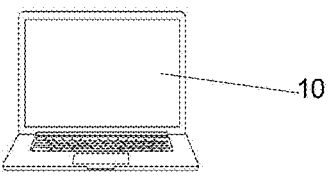
FIG. 1 is a diagrammatic view of an environment including user devices, networks, a server, stations, and autonomous robotic units that self-deliver and return under server coordination.
Figure 2:
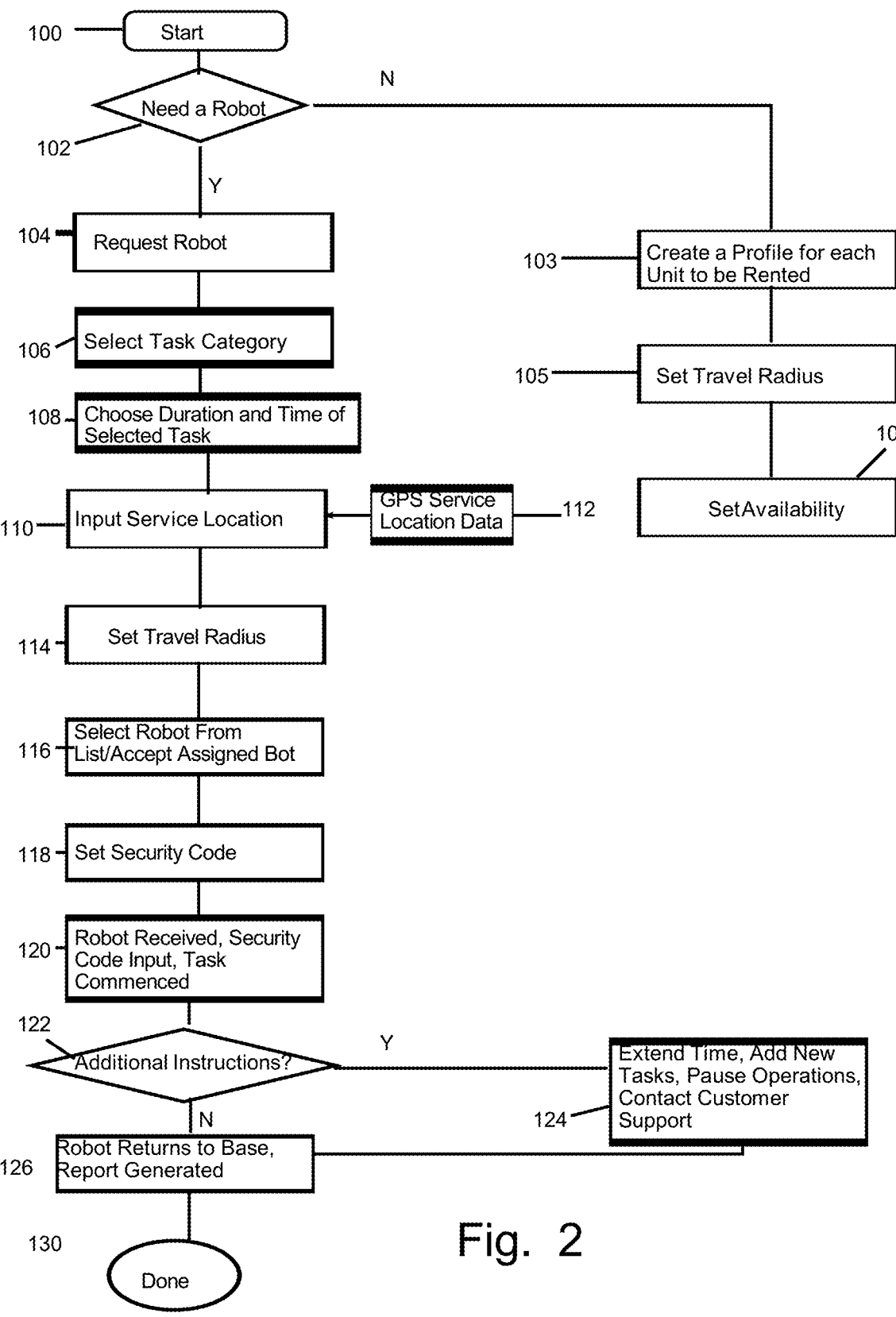
FIG. 2 is a flow diagram from request through assignment, authenticated handoff, task execution, optional user interactions, and autonomous return with report generation.

This section describes representative, non-limiting implementations sufficient for a person having ordinary skill in mobile robotics and networked systems to make and use the invention. References to "the robot," "the robotic unit," or "unit 21" denote a self-mobile platform with onboard locomotion and navigation capable of autonomous travel to and from a service location. References to "the server" or "server 26" denote one or more processors and memory, including cloud-distributed resources, that coordinate assignment, authentication, and logging. References to "stations 20" denote facilities where robots are stored, charged, and maintained. The client software on a user device 10 coordinates requests and status display. FIG. 1 depicts an environment including user device 10, networks 22 and 24, server 26, stations 20, and robots 21. FIG. 2 depicts a flow beginning at application launch and continuing through assignment, authenticated handoff, task execution, and autonomous return.

Referring to FIG. 1, a representative environment of the invention is shown. A user accesses the system using a communication device 10, such as a smartphone or laptop executing a client application. The device 10 exchanges messages over one or more networks 22 and 24, which may include the public Internet, cellular data networks, Wi-Fi, Ethernet, or dedicated links. A server 26, implemented as one or more processors with persistent storage, receives requests from device 10, performs assignment, security, and logging functions as described herein, and coordinates with a plurality of robot stations 20. Each station 20 is a facility, which can be a commercial depot or a private residence, where one or more self-mobile robotic units 21 are stored, charged, maintained, and dispatched. The robotic unit 21 is an autonomous mobile machine equipped with locomotion, navigation sensors, a navigation processor, a radio interface, a user interface, and a hardware activation gate. In some embodiments a biometric interface such as a retinal scanner or a camera usable for face capture or a microphone for voice capture is integrated into the user interface. In operation, the server 26 communicates with stations 20 and the robots 21 over networks 22 and 24 to push signed trip plans, receive state updates, and close out signed audit logs.

Turning to FIG. 2, a flow of the method is depicted from initial request through authenticated handoff, task execution, and autonomous return. At start 100, the client application running on device 10 is launched and establishes connectivity with server 26. At decision 102 the user selects whether to rent a robot or to list a robot for rent. When the owning user is onboarding a robot, block 103 represents creating a robot profile on the server 26 with make, model, serial number/identifier, capability descriptors, and calibrated energy parameters used by the assignment engine; block 105 represents setting a travel radius policy and any time-of-day or neighborhood restrictions; and block 107 represents setting availability windows for the robot in real time based on owner preferences and current job status. When a renting user initiates a request, the method follows 'Y' branch of decision block 102. Block 104 represents starting the rental request. Block 106 represents selecting a task category such as cleaning, lawn work, delivery, or tutoring assistant, which determines a default task energy model and allowed behaviors and block 108 represents selecting the desired duration, date, and time. In block 110, the user confirms the service location, which can be proposed by GPS or network geolocation as indicated by block 112, and the app displays a confirmation prompt to avoid mis-delivery. In block 114, the user sets or accepts a travel radius. The server's assignment engine then evaluates candidate robots within that radius and computes an energy-feasible self-delivery and return plan subject to a reserve margin and geofenced corridor compliance as detailed herein. The client application displays a list or map of assignable robots along with estimated arrival and completion times, after which selection occurs at block 116. Once a robot is selected, block 118 depicts creation and delivery of activation credentials: the server 26 generates a nonce-bound, time-limited activation token and derives a human-enterable short code, transmits the token securely to the assigned robot 21, and presents the short code to the user in the client application. The server also transmits a signed trip plan to the robot including waypoints, corridor constraints, and time windows. The robot departs station 20 and travels under its own power along the planned route while streaming state for live display. Upon arrival at the destination, block 120 represents the local, on-device challenge-response in which the user supplies the short code and/or a biometric factor; only if verification succeeds does the robot assert its hardware activation gate and commence the task. As part of block 120, the robot and server also perform mutual attestation, in which the robot signs an arrival tuple containing at least a task identifier, a monotonic-clock timestamp, and a location estimate using a key in the secure element and transmits the signature for server verification prior to actuator enablement. During task execution, block 122 represents in-task interactions, including user-requested extensions or subtasks, which the server evaluates against the energy reserve before permitting; block 124 represents optional support, including escalation to human assistance if authentication fails, a path is blocked, or an incident is detected. At block 126 the robot autonomously returns to its station under its own locomotion along an energy-feasible route, docks, uploads a signed audit log, and performs cryptographic erasure of transient user data. If an evidence mode was enabled and a claim is initiated within a retention window, the robot or server provides a tamper-evident evidence package as described in this specification.

The self-mobile robotic unit used in the system is implemented as a wheeled, tracked, or legged mobile platform. In a typical embodiment, the base is a differential-drive chassis with two brushless DC drive motors and an auxiliary caster, although an omni-drive or tracked platform can be used when tighter holonomic manoeuvring or rough terrain is expected. The locomotion subsystem includes motor controllers capable of closed-loop velocity and position control using quadrature wheel encoders. The unit carries a rechargeable battery pack, such as a lithium-ion pack sized between hundreds of watt hours and several kilowatt hours depending on payload and duty cycle, and a battery management system measuring state of charge, pack voltage, current, temperature, and health. A power distribution board provides regulated rails for compute, sensors, radios, and actuators and includes a safety-rated hardware activation gate in the form of a normally open relay or safety controller that physically disconnects the actuator rail for the drive and any manipulator until a dedicated enable line is asserted by an onboard authentication module. This device-level interlock ensures that actuators cannot energize without successful local verification at arrival.

The robot includes navigation sensors enabling autonomous travel. In one implementation, a planar lidar provides a dense range scan for obstacle detection and localization, a stereo or depth camera supplies obstacle and terrain perception, a nine-axis inertial measurement unit delivers accelerometer and gyroscope data, and wheel encoders provide odometry. Outdoors, a GNSS receiver improves absolute position; indoors, the system relies on visual-inertial odometry fused with wheel-based odometry. The robot runs a navigation processor comprising at least one CPU and optionally a GPU or NPU to accelerate perception and planning. The processor executes simultaneous localization and mapping to maintain a local map and pose estimate, and it executes a global planner such as A* or D* over an occupancy grid or topological graph to compute a collision-free route to the service location while a local planner performs real-time obstacle avoidance and trajectory generation, inflates obstacles by a configurable safety margin, and enforces kinematic and dynamic limits compatible with the base. In one implementation, the navigation processor executes a graph-based SLAM with loop closure in which a pose graph is optimized when previously seen features are re-observed, thereby reducing drift before and during long traversals. The server provides a corridor map segment for the job (e.g., a polyline or occupancy-mask in a global frame); the robot aligns this segment to its local map via an SE(2) transform and constrains the global planner (A* or D*) to expand only nodes/cells that lie inside the corridor mask-cells outside the mask are pruned or assigned prohibitive cost. As lidar/camera perception updates occupancy, the robot incrementally edits the corridor segment locally to reflect temporary obstacles and re-plans using D* (or re-runs A*) so that routes adhere to the corridor while detouring around new obstacles; the edited segment and traversal statistics may be uploaded to the server to refine future corridor tiles. The navigation stack is configured to respect geofenced corridors, such as sidewalks and building ingress paths, that the server communicates with the assignment.

In a preferred implementation the robotic unit includes a control processor that orchestrates sensing, planning, communications, and safety interlocks. The control processor may be a system-on-chip single-board computer or micro-controller-class CPU executing a real-time operating system, and it is operably coupled to the navigation processor, radio interface, user interface, secure element, and motor controllers over one or more internal buses such as CAN, I²C, SPI, Ethernet, or USB. The control processor executes the robot's supervisory logic and machine-learning inference workloads, monitors heartbeat and health telemetry from the navigation processor, and arbitrates mode transitions among "transit," "arrival/authentication," "task," "custody-loss," and "return." A dedicated, safety-rated output of the control processor (or a companion safety microcontroller) drives the hardware activation gate that physically connects or disconnects power to the drive and manipulator actuators; the gate defaults to a de-energized state and requires a positive enable signal after successful local verification of the server-issued activation token or bound biometric factor using cryptographic services of the secure element. The control processor also supervises the radio interface by maintaining a mutually authenticated channel with the server, queues and signs control-critical events and audit records using keys protected by the secure element, and initiates cryptographic erasure of transient user data on task completion. This architecture ensures that a single, general-purpose controller coordinates AI inference, back-end communications, and gate signaling, providing a concrete hardware and software mechanism for the functions recited in the claims.

The server maintains a fleet state database with the battery state of charge, pose estimates, capability descriptors, and health of each robot and persists a library of map tiles or corridor graphs for common service areas. When a user submits a task request from device 10 as in FIG. 2, the client application transmits the task class, the desired start time, the planned duration, and a nominated service location. The location may be obtained using the user device's GPS or network-based positioning and is presented for confirmation in the app to avoid mis-delivery. The server's assignment engine computes an energy-feasible plan for each candidate robot within a configurable search radius by estimating trip energy as the sum of outbound travel energy, expected task energy at the site, and return energy. For wheeled bases, travel energy is modeled as the integral over route length of rolling resistance and mechanical losses together with energy consumed during accelerations and decelerations and the model corrects for terrain class and slope by adding a term that accounts for climbing segments and subtracting a regenerative term if the base supports energy recovery on descents. The server consults a terrain annotation of the corridor graph that distinguishes sidewalks, ramps, carpeted interiors, and thresholds at doorways, and parameters are initially calibrated during commissioning and then adapted over time using logged current, voltage, and velocity measurements. Task energy depends on task class and robot configuration, for example continuous operation of a vacuum motor at a specified airflow, actuation of a manipulator at a certain duty cycle, or stationary monitoring with minimal actuation. The engine enforces a reserve margin, such as fifteen to thirty percent of nominal capacity, to account for uncertainties and to guarantee a safe return. A robot is assignable only if its present energy budget expressed from state of charge (SoC) exceeds the sum of outbound (E_outbound), expected task (E_task), and return energy (E_return) plus the configured reserve (E_reserve), which can be expressed as a condition $Soc\_now \geq (E\_outbound + E\_task + E\_return)/C + E\_reserve$ where $C$ is the usable capacity fraction. If this constraint fails for every candidate, the system may propose an alternative start time, a shorter duration, or a hybrid plan.

A hybrid plan refers to a journey in which the robot uses a vehicle ride segment for a portion of the distance and then performs a last-mile autonomous segment under its own power. In that case, the energy model accounts for vehicle ingress and egress manoeuvres, the energy to traverse from a drop-off point to the service location, and the return to a pick-up point or station. Even with a hybrid leg, the local handoff, actuator gating, and return remain as described for full self-delivery so that the security and privacy properties are preserved.

Before dispatch, the server's security service generates a time-limited activation token that the robot will verify on arrival. A per-robot secret key is stored in a secure element on the robot that supports key generation, keyed hashing, and signature operations inaccessible to the host processor. The server issues a random nonce and computes a token over a tuple comprising the nonce, a task identifier, and an expiry time using a keyed hash algorithm, and it derives a human-enterable short code from the token by truncation and checksum in a format suitable for spoken or typed entry. The short code is presented to the user in the app and is valid only within a defined time window at the expected location. The server transmits the token and the signed trip plan to the robot over a mutually authenticated channel that prevents downgrade or interception.

The robot then departs a station 20 and travels autonomously under its own power toward the confirmed location. Along the route, the robot uses the global plan provided by the server and adapts locally to dynamic obstacles such as pedestrians, pets, and temporary obstructions by fusing lidar, depth, and inertial data. Localization uses odometry and loop closure to correct drift; if GNSS is available, fused absolute fixes are incorporated to control long-range error. Where building ingress is required, the server may provide door or elevator control instructions, and the robot may present a QR code or use a wireless credential to interact with a building controller under policies stored at the server. The plan includes waypoints at lobby areas and elevator banks and allocates time windows for these interactions so the energy model remains accurate. Where the server (and, if needed, the robot) are provisioned with credentials and documented endpoints of a building, the building controller (for example, a networked door access system or elevator dispatcher) exposes an authenticated API reachable over the networks 22, 24. The server 26 holds the per-building credentials and policy. As the robot 21 approaches an ingress or elevator-lobby waypoint, it notifies the server with its fused pose and waypoint ID; the server then contacts the building controller over a mutually authenticated TLS session and requests actuation for that specific door or elevator, time-bound to the current window. The server can also mint a short-lived access token that is geofenced to the waypoint and include it in the controller request so it cannot be replayed elsewhere. Upon controller acknowledgement, the server returns a proceed instruction to the robot; the robot confirms access locally by sensing door state or car arrival and then traverses the ingress. The entire exchange—request, controller response, timing, and traversal confirmation—is recorded in the signed audit log. If the controller denies access or a timeout occurs, the control processor evaluates alternatives consistent with the corridor constraints, such as waiting and retrying, selecting an alternate entrance, or requesting human assistance, and the cost model is updated with the observed dwell for future planning.

Upon arrival at the service location as represented by block 120 in FIG. 2, the robot initiates the local handoff procedure. The unit announces its presence using a speaker and display and prompts for authentication. In a code-based variant, the user reads or recalls the short code from the app and enters it via touchscreen or speaks it. Spoken entry is recognized using an on-device speech recognizer, and the transcribed digits are checked locally; network connectivity is not required to verify the code. The robot recomputes the expected token using its secure element and compares it to the received token or a locally derivable value; only if the comparison succeeds and the token has not expired does the unit assert the hardware activation gate enable line and energize the actuator rail. In a biometric variant, the user's biometric template, such as a voiceprint or face embedding, is enrolled during account setup and bound to the same task identifier and expiry as the short code. At arrival, the robot captures the user's voice saying a random challenge phrase or captures a face image using a near-infrared camera and checks liveness cues such as blink, lip motion, or a prompted head turn. The template match and liveness checks run on the robot; only a signed result is transmitted to the server. No raw biometric images leave the robot except when an insurance claim workflow described below has been enabled and triggered. If authentication fails a defined number of times or the challenge indicates a mismatch, the robot does not energize actuators, informs the server, and either retries after a delay or requests human assistance.

Before any actuator can be energized, the system performs a mutual attestation between the robotic unit and the server to confirm both parties' identities and bind the arrival event to the assigned task. During dispatch, the server issues an attestation challenge that includes a fresh server nonce and the task identifier, and signs the trip plan; the robot verifies the server over a pinned, mutually authenticated transport session and caches the challenge. Upon arrival at the service location, the robot composes an "arrival tuple" that at minimum includes the task identifier, a monotonic-clock timestamp, a location estimate derived from the robot's fused localization (expressed as latitude/longitude with optional quantization or, indoors, as a corridor-graph node identifier), and a pose uncertainty value. In preferred implementations the tuple further carries a firmware-measurement digest identifying the bootloader, OS image, and safety application currently running, together with a counter or sequence number from the secure element to prevent replay. The robot's secure element stores an attestation private key that never leaves the device; the control processor asks the secure element to compute a digital signature over a hash of the arrival tuple concatenated with the server's challenge, and transmits the tuple, the signature, and the robot's attestation certificate (or certificate chain) to the server. The server verifies the certificate chain against a registry, checks signature validity and nonce freshness, confirms that the reported location lies within the authorized geofence for the job and that the timestamp falls within the activation window, and records the verified tuple in the signed audit log. The server then returns a server attestation response-namely, a server-signed confirmation bound to the same task identifier and a fresh server nonce-which the robot verifies before accepting any further commands tied to that job. Only after both the mutual attestation and the local user challenge-response (short code and/or biometric) succeed does the control processor issue the gate-control signal that actuates the hardware activation gate. If network connectivity is unavailable at arrival, the robot proceeds with local user authentication and logs a locally signed arrival tuple for later upload; when connectivity resumes, the server verifies the stored tuple and closes the attestation loop. Keys may be rotated under server policy, and all attestation materials are retained only within the audit-log retention period described herein so that privacy guarantees are preserved.

Once activated, the robot executes the assigned task. For a cleaning task, the unit follows a coverage path within a defined area while maintaining standoff distances from walls and furniture detected in the depth map; for a tutoring assistant task, the unit remains stationary but energizes its display and audio interface; for a delivery task within a building, the unit navigates to internal waypoints while carrying a payload in a locked compartment that opens only while the activation token remains valid. The robot continues to account for energy consumption and periodically evaluates whether sufficient reserve remains to complete the task and return; if not, the unit requests permission through the app to shorten or pause the task and informs the user of the earliest time by which the task can safely resume. Throughout operation, the robot streams state consisting of pose, velocity, battery percentage, and task status to the server, which the client app renders on a map as a real-time location indicator. The position presented to the user is derived from the fused localization estimate and is filtered to reject improbable jumps; raw camera images are not transmitted during normal operation.

The system provides privacy-scoped sensing tailored to the task profile. In a baseline mode, audio and video sensor pipelines operate with short ring buffers in volatile memory to enable navigation and safety reactions, but the buffers are overwritten within seconds and no user imagery is persisted beyond transient processing. At the conclusion of the task, the robot executes a cryptographic erase by invalidating keystores used to encrypt any remaining transient buffers and by writing zeros or random patterns into reserved scratch areas if present. In an evidence mode explicitly enabled by the user or owner in the app, the robot records synchronized audio, video, and key sensor streams during control-critical events such as arrival, activation, collisions, or emergency stop, and seals them within a tamper-evident container. The sealed container is created by hashing each frame or sensor block into a chain anchored at the activation token and signing periodic checkpoints with a private key stored in the secure element. The container includes timestamps from a monotonic clock synchronized during dispatch, the robot's estimated pose trajectory, and metadata describing sensor calibration. If an incident occurs that could result in a claim—such as a collision with a fragile item or a manipulation fault—the evidence container is uploaded to the server and retained for a limited window, for example forty days. At the end of the retention window, the server deletes the container and the robot has already destroyed the key material necessary to decrypt any local remnants, rendering the data unrecoverable. In an alternative embodiment echoing a removable-media workflow, the robot writes the evidence container to a user-owned memory device inserted in a locked bay and hands the device to the user at the end of the task, which provides complete local custody for users who prefer not to store evidence in the cloud.

The insurance functionality is implemented as a technical workflow rather than merely a contractual arrangement. When a user or owner files a claim in the client app, the server's claims module requests the associated evidence container, verifies the signatures and hash chain for integrity, and extracts only the segments relevant to the incident as indicated by timestamps and event markers. Computer vision or audio classifiers may be applied to detect whether a human action, a pet, or an autonomous behavior caused the event, but the claims module always produces a signed report including the verification results and a listing of the deterministic events that occurred immediately before the incident. This report is made available to an insurer or to the parties; absent an affirmative claim inside the retention window, the container expires and is irreversibly destroyed by key erasure and server deletion. This architecture describes how recorded data is used to assess liability in concrete, bounded, and technologically specific terms.

The return phase mirrors the outbound phase. When the task concludes or the battery approaches a reserve threshold, the robot computes a return plan that satisfies the reserve and geofence constraints and navigates under its own power back to station 20. If the route contains an elevator or door traversal that was used outbound, the same credential or QR process is repeated. Upon docking, the robot closes the audit log, which is a signed sequence of records containing event type, timestamp, pose, battery percentage, and outcome codes for authentication, activation, start, pause, error, resume, and completion. The log uses a hash-linked structure so that any removal or reordering is detectable. The server checks the log's signature against the robot's registered public key and persists the log in an append-only store. The robot then opens its actuator relay, de-energizes actuators, and begins charging. Maintenance counters for wheels, brushes, filters, batteries, and other consumables are updated based on run time and motor current, and the server may schedule preventive maintenance when thresholds are met.

The system supports a variety of failure modes. If the robot loses network connectivity during travel, it continues to the destination under its local navigation stack; because the challenge—response and activation gate operate locally, the robot can complete handoff without a live link and the server will reconcile the log when connectivity returns. If the robot detects a hazard such as an untraversable gap, an unexpectedly steep curb, or a blocked corridor, it replans around the hazard using its local map; if replanning fails within a defined time budget, the robot chooses a safe waiting location and requests assistance. If authentication fails at arrival, actuators remain de-energized, the robot remains in a safe posture, and it either reattempts authentication or returns under its own power if the retry budget is exhausted. If battery state of charge unexpectedly drops faster than modeled, the unit evaluates whether it can safely return immediately; if not, it seeks a nearby public charging point when supported or requests pick-up.

In preferred implementations, the server assignment engine chooses among multiple candidate robots by first filtering on capability and travel radius, then enforcing the energy-feasible constraint with reserve, and then ranking by a cost function that trades off estimated arrival time, predicted task completion time, network quality along the route, and historical reliability of each robot. The parameter used in the cost function include but not limited to battery state of charge, travel radius, terrain classification and slope profile along candidate routes, predicted travel time given typical pedestrian traffic patterns, and a reserve margin. Weather may be considered when the robot operates outdoors; rain or snow reduces speed and increases rolling losses, which the engine reflects by adjusting parameters before computing energy and time estimates. Owners may impose blackout windows, unsafe neighborhoods, or maximum job durations; these constraints are stored as policies and are evaluated before assignment.

The user device application provides a live map with the robot's location, a timeline of the job, and controls to extend or curtail the task. The server streams state at intervals suitable for smooth presentation, and the app interpolates between updates to present continuous motion while preserving the privacy policy that no raw video is displayed by default. If the user explicitly opts in to supervision, the robot can stream a low-resolution video with privacy masking, but this is not required for any of the core functions and is not used to satisfy location presentation in the claims. The app displays the short code and, for biometric variants, shows the expected phrase or motion for liveness checking, with timeouts and retry counts clearly indicated.

Security is addressed throughout the design. Arrival events are bound cryptographically by mutual attestation between the robot and server as described herein, using attestation keys resident in the secure element and verified over a pinned, mutually authenticated transport. The robot uses secure boot to ensure only signed firmware runs on the navigation and authentication modules, and firmware updates are delivered as signed images verified before installation. The secure element stores long-term keys and wraps session keys used for the activation token and evidence signing; keys are never exposed in host memory. Communications between robot, server, and user device employ transport-layer security with certificate pinning to the server's public keys. The activation token includes an expiry time and a nonce so that replay or reuse is ineffective. The activation gate is implemented as a hardware relay or safety controller that defaults to an open, de-energized state on any fault or reset, and its enable line is driven only by the authenticated module whose firmware is measured and verified at boot.

In the event a rented robot is intentionally retained beyond the task window or transported to an unauthorized location, the system transitions the unit into a custody-loss mode designed to preserve safety, privacy, and asset integrity while enabling recovery. The robot continuously compares its fused localization estimate to the signed trip plan and a policy geofence; deviation beyond a tolerance, prolonged stationary time at a non-work waypoint, or transport dynamics inconsistent with self-locomotion—such as sustained wheel-encoder slippage combined with inertial signatures of lifting or vehicle motion, or an abrupt GNSS delta without matching odometry—triggers the mode. In this invention, a 'fused localization estimate' is the robot's computed pose (position and orientation) and associated covariance obtained by statistically combining, in real time, measurements from heterogeneous sensors such as wheel encoders, an inertial measurement unit, cameras for visual odometry/SLAM, lidar for scan matching, and GNSS when available, using a sensor-fusion algorithm (e.g., an extended Kalman filter or factor-graph optimizer) to improve accuracy and robustness over any single source. Upon trigger, actuators remain or are placed in a safe, de-energized state because the hardware activation gate cannot be asserted without a valid, time-limited activation token bound to the task and location; any payload compartment is locked; and the unit restricts local interfaces to a limited "return" screen. The robot preserves or increases the configured energy reserve and executes one of two behaviors under server policy: if egress is safe, it autonomously navigates to a designated public rendezvous point or station using a low-power route; if egress is not safe or network connectivity is absent, it remains stationary in a safe posture, records a short evidence segment inside the secure enclave, and initiates beaconing using a communication protocol (such as LTE-M, Wi-Fi, BLE, or UWB) to provide coarse and fine recovery location. The server simultaneously escalates by notifying the owner and renter through the client application, logging the last known pose and time in the signed audit log, temporarily disabling any new activation tokens for that unit, and, if enabled by owner policy, sharing recovery telemetry with a designated security provider. Cryptographic erasure policies remain in force so that transient user data is not exposed during recovery; only the minimal tamper-evident evidence package associated with the custody-loss event is retained for the configured window. When the robot re-enters an authorized geofence or a verified handler presents a server-issued recovery token at the device, normal operation resumes and the custody-loss event is closed in the audit log.

Alternative embodiments remain within the scope of the claims and support enablement. A legged robot such as a small biped or quadruped uses the same authentication and activation gate principles, but the energy model accounts for gait costs and slope handling and the locomotion controller outputs joint trajectories rather than wheel velocities. A stationary tutoring or concierge robot can still self-deliver on wheels to the location and then remain static during the task. A robot operating in a campus where GNSS is unavailable can rely entirely on visual-inertial odometry and pre-shared corridor maps; the server's assignment engine uses route lengths measured in that graph coupled with empirically learned energy parameters. A robot constrained to operate indoors in a multi-tenant building uses the lobby and elevator ingress procedures already described, and the energy model includes elevator wait time as a constant power draw and the negligible energy to ride the elevator in a passive state.

As used herein, a "self-mobile robotic unit" is a machine with locomotion, sensing, compute, communications, and a hardware activation gate, capable of carrying out an autonomous route plan to a service location and back. "Sending the robot under its own power" and "sending back" are implemented by the robot's navigation and locomotion subsystems executing planned trajectories that produce actuator commands at control rate until arrival or docking. A "geofenced corridor" is a route constraint represented in the map that the planner honors to keep the robot on sidewalks, lobbies, or other approved areas. Other parameters used during assignment explicitly include battery state of charge, travel radius, terrain classification, slope profile, predicted travel time, and a configured reserve margin, and may additionally include weather or building access constraints when available. "Cryptographic erasure" means rendering any residual data inaccessible by destroying encryption keys used to protect it; buffer overwrite may be used in addition. "Tamper-evident evidence package" means a container of synchronized frames and sensor data signed or otherwise bound by a hash chain and digital signature such that modification is detectable.

To the extent software is recited, it resides on non-transitory computer-readable media such as flash memory and is executed by the processors of the server and robot. The computer-implemented method described herein is realized by instructions that, when executed, cause the processors to carry out dispatch, navigation, authentication, activation, logging, evidence sealing, and return. The specification provides sufficient detail for implementing those instructions using standard operating systems and robotics middleware such as ROS or equivalent frameworks, and the physical hardware and safety gating are described at a level that permits construction using commercially available relays, secure elements, sensors, compute modules, motor controllers, and batteries.

The invention claimed is:

1. A system for authenticated self-delivery and return of an autonomous service robot, comprising:

at least one self-mobile robotic unit comprising:

a locomotion subsystem, a navigation processor, a radio interface, a user interface, a secure element storing a per-robot secret, a control processor operably coupled to the navigation processor, radio interface, user interface, secure element, and the locomotion subsystem, and a hardware activation gate that, in response to an enable signal, selectively couples power to a drive actuator and a manipulator actuator;

a server having at least one processor and memory storing:

a security service and an assignment engine operable to compute for an available robotic unit an energy-feasible self-delivery and return plan that enforces a travel-radius constraint and a reserve-energy margin by evaluating a total energy budget including outbound travel energy, expected task energy, and return energy over a route through geofenced corridors, in response to a user request identifying a task class, a start time, a duration, and a service location;

wherein the security service is configured to generate a server nonce and a time-limited activation token computed from the nonce and the per-robot secret, and to derive a human-enterable short code bound to the activation token;

wherein the server is configured to transmit to the robotic unit (a) a server-signed trip plan defining at least the route through the geofenced corridors and (b) the time-limited activation token, over a mutually authenticated channel;

wherein the navigation processor is configured to, under autonomous control, execute a path plan to the service location using onboard sensing and obstacle avoidance; and wherein the control processor is operable to, upon arrival of the robotic unit at the service location, (i) verify the short code presented by a local user or verify a biometric factor bound to the activation token using the secure element, (ii) assert and de-assert the enable signal to the hardware activation gate, (iii) supervise bidirectional communications over the radio interface with the server during task execution, (iv) cryptographically erase transient user data at completion of the task, (v) sign and upload an audit log of control-critical events, and (vi) command the robotic unit to autonomously return under its own locomotion to a station, wherein the control processor is further operable to verify a signature of the server-signed trip plan before executing the path plan; and wherein the control processor is further operable, before asserting the enable signal, to perform mutual attestation with the server by: (a) generating, using a key stored in the secure element, a signed arrival tuple including at least a monotonic-clock timestamp and a location estimate; (b) transmitting the signed arrival tuple to the server for verification that the location estimate is within an authorized geofence and the timestamp is within an activation window; and (c) asserting the enable signal only upon receiving a server-signed attestation response that validates the signed arrival tuple.

2. The system of claim 1, wherein the user interface accepts a spoken code and the robotic unit performs on-device speech recognition to derive the code for verification without transmitting the spoken code to the server for recognition.

3. The system of claim 2, wherein the robotic unit performs mutual attestation by signing an arrival tuple including a timestamp and location estimate with a key stored in the secure element and transmitting the signature to the server for verification, wherein:

(a) the robotic unit receives from the server an attestation challenge comprising a fresh server nonce and a task identifier;

(b) the arrival tuple includes at least the task identifier, a monotonic-clock timestamp, the location estimate, and a pose uncertainty value, and further includes a firmware-measurement digest and a secure-element counter or sequence number to prevent replay; and (c) the server returns a server-signed attestation response bound to the task identifier and a fresh server nonce, and the control processor asserts the enable signal to the hardware activation gate only while the server-signed attestation response remains valid.

4. The system of claim 3, wherein the hardware activation gate comprises a safety-rated relay that physically disconnects actuator power rails, the safety-rated relay being normally-open and defaulting to open upon loss of control power, fault, or watchdog timeout, and wherein the control processor asserts the enable signal only upon (i) successful local verification of the short code or biometric factor and (ii) successful verification of the server-signed attestation response.

5. The system of claim 4, wherein the server retains any evidence packages for a retention window and automatically deletes them thereafter, wherein each evidence package is encrypted under a per-task data-encryption key and the secure element implements key wrapping such that the per-task data-encryption key is wrapped by a key-encryption key that never leaves the secure element, and wherein cryptographic erasure includes destroying the key-encryption key and/or the wrapped key material such that the evidence package becomes unrecoverable in addition to the server-side deletion after the retention window.

6. The system of claim 5, wherein the assignment engine selects among multiple candidate robots by minimizing estimated arrival time subject to the travel radius and energy constraints and geofence travel time estimates, and subject to corridor constraints and time windows defined in the server-signed trip plan.

7. The system of claim 6, wherein the geofenced route includes waypoints at building ingress points and elevator lobbies, and the server communicates with a building controller over a mutually authenticated session to request door unlocking or elevator dispatch by presenting a time-limited, waypoint-bound access token, the robotic unit confirming access via onboard sensing and recording the request, controller response, and timing in the audit log, wherein the time-limited, waypoint-bound access token is derived from the server nonce and bound to (i) a waypoint identifier and (ii) an access time window, and the audit log entry for the request is signed using the secure element.

8. A self-mobile robotic unit comprising:
a locomotion subsystem;
navigation sensors coupled to a navigation processor executing simultaneous localization and mapping and path-planning software;
a control processor operably coupled to the navigation processor, a radio interface, a user interface, and a secure element storing a per-robot secret and executable code for verifying activation tokens; and
a hardware activation gate interposed between a power source and at least one of a drive actuator and a manipulator actuator;
wherein the navigation processor is operable to compute and traverse, under autonomous control, a route to a service location and a return route;
wherein the robotic unit is operable to, upon arrival at the service location, perform a local challenge-response using a time-limited activation token bound to a server nonce and a task identifier;
wherein the control processor is further operable to issue a gate-control signal to actuate the hardware activation gate so as to selectively couple power to the at least one actuator only upon successful verification, supervise radio communications with a remote server during task execution, and sign control-critical events using the secure element; and
wherein the robotic unit is further operable to perform privacy-scoped sensing in which transient user audio and video buffers are processed in memory and cryptographically erased at task completion, and, when a hazard trigger occurs, to seal time-aligned sensor data including image frames each tagged with a monotonic-clock timestamp and corresponding metadata into a tamper-evident evidence package signed by the secure element;
wherein the robotic unit is further operable to verify, prior to navigating the route, a signature over a server-signed trip plan received from the remote server, the server-signed trip plan defining corridor constraints for the route; and
wherein the robotic unit is further operable, before actuating the hardware activation gate, to produce a signed arrival tuple including at least a monotonic-clock timestamp and a location estimate using a key stored in the secure element and to receive a server-signed attestation response confirming that the signed arrival tuple is verified and that the location estimate is within an authorized geofence.

9. The self-mobile robotic unit of claim 8, wherein the navigation processor executes a SLAM algorithm with loop closure and an A* path planner that adheres to a corridor map segment received from the remote server and updated by onboard sensing, the corridor map segment being included within the server-signed trip plan and subject to signature verification prior to use, and wherein updates to the corridor map segment generated by onboard sensing are uploaded to the server together with an integrity value and recorded in the signed audit log.

10. The self-mobile robotic unit of claim 9, wherein the secure element implements key wrapping for the evidence package such that cryptographic erasure is performed by destroying an enclave key, wherein:
    (a) sensor frames sealed into the evidence package are encrypted under a per-task data-encryption key;
    (b) the per-task data-encryption key is wrapped by a key-encryption key stored only within the secure element; and (c) cryptographic erasure comprises destroying the key-encryption key and/or deleting wrapped key material in the secure element, thereby rendering the encrypted evidence package unrecoverable even if the encrypted evidence package persists in storage.

11. The self-mobile robotic unit of claim 10, further comprising a GNSS receiver used when available to improve global pose, the robotic unit falling back to vision-inertial odometry indoors, wherein, when indoors, the location estimate in the signed arrival tuple is expressed as a corridor-graph node identifier and compared against the corridor constraints of the server-signed trip plan, and wherein in a custody-loss mode the robotic unit uses intermittent GNSS pings and a motion classifier to detect transport dynamics inconsistent with self-locomotion.

12. The self-mobile robotic unit of claim 11, wherein the robotic unit performs mutual attestation by signing an arrival tuple including a timestamp and a location estimate with a key stored in the secure element and transmitting a signature to the remote server for verification, wherein the arrival tuple includes a task identifier, a monotonic-clock timestamp, a pose uncertainty value, and a firmware-measurement digest, and wherein the robotic unit actuates the hardware activation gate only after receiving and verifying a server-signed attestation response bound to the task identifier and validating geofence compliance and freshness.

13. The self-mobile robotic unit of claim 12, wherein the hardware activation gate comprises a safety-rated relay that physically disconnects actuator power rails, the safety-rated relay being normally-open and configured to drop out upon fault or watchdog timeout, and wherein the relay is energized only while the robotic unit maintains successful verification of (i) the activation token and (ii) the server-signed attestation response.

14. A computer-implemented method for controlling an autonomous service robot, the method executed by at least one server and at least one robotic unit, comprising:

receiving, at the server, a task request including a task class, a start time, a duration, and a service location confirmed by a user;

computing, at the server, an energy-feasible self-delivery and return plan for a robotic unit by enforcing a travel radius and a reserve-energy margin and by evaluating outbound, task, and return energy over a geofenced route;

assigning, at the server, a robotic unit for the task; and transmitting, from the server to the assigned robotic unit over a mutually authenticated channel, a server-signed trip plan defining at least corridor constraints for the geofenced route and a time-limited activation token derived from a server nonce and key material associated with the robotic unit and verifiable by a secure element;

executing, at a control processor of the robotic unit, perception, localization, and path-planning routines while supervising a radio interface and coordinating with a navigation processor to navigate, under autonomous control and using onboard sensors and the server-signed trip plan, to the service location under its own power;

upon arrival at the service location, performing, at the robotic unit, a local challenge-response with a user by verifying a short code or a biometric factor bound to the activation token using the secure element;

prior to driving the hardware activation gate, performing mutual attestation with the server by transmitting a signed arrival tuple including at least a monotonic-clock timestamp and a location estimate and receiving a server-signed attestation response confirming geofence compliance and freshness;

driving, from the control processor, a hardware activation gate so as to enable actuators only upon successful verification;

executing the task while streaming state for display on a user computing device comprising at least one of a smartphone, tablet, or laptop executing a client application and signing and logging control-critical events;

after completion of the task, cryptographically erasing transient user data, sealing any hazard-triggered evidence into a tamper-evident package signed by the secure element, and uploading a signed audit log; and autonomously returning, under the robotic unit's own locomotion and under control of the control processor coordinating with the navigation processor, along an energy-feasible route to a station.

15. The method of claim 14, further comprising denying a user request to extend the task when the extension would violate a configured reserve energy margin, wherein the server recomputes an updated energy-feasible self-delivery and return plan in response to the extension request and (i) denies the extension if the updated plan would violate the reserve energy margin, and (ii) upon denial, instructs the robotic unit to close out the task and autonomously return under the corridor constraints of the server-signed trip plan.

16. The method of claim 15, wherein live location presented on the user device is generated from fused localization on the robotic unit, wherein the fused localization is continuously compared to the corridor constraints of the server-signed trip plan and a policy geofence, and wherein deviation beyond a tolerance triggers a custody-loss mode in which the server inhibits actuator enablement by withholding a server-signed attestation response and/or revoking the activation window.

17. The method of claim 16, further comprising, upon detection of a collision or manipulation fault by an onboard classifier, sealing synchronized sensor frames and timestamps into the evidence package together with a hash chain and a signature bound to the activation token, wherein:

(a) the timestamps comprise monotonic-clock timestamps;

(b) the hash chain is computed over ordered frame hashes and associated metadata such that removal or reordering is detectable; and (c) the signature is generated by the secure element over at least (i) a root hash of the hash chain, (ii) the activation token, and (iii) the task identifier, thereby binding the evidence package to the authenticated task.

18. The method of claim 17, wherein, when the energy-feasible constraint fails for a full self-delivery, the server replans using a hybrid leg that includes a vehicle ride segment followed by a final self-locomotion segment, the robotic unit still performing local authentication and actuator gating upon arrival, wherein the server-signed trip plan defines (i) a pickup waypoint, (ii) a drop-off waypoint, and (iii) corridor constraints for the final self-locomotion segment from the drop-off waypoint to the service location, and the robotic unit verifies the signature over the server-signed trip plan before performing the final self-locomotion segment.

19. The method of claim 18, wherein the geofenced route includes waypoints through building ingress points and elevator lobbies, and the robot communicates with building controllers via the server to request door or elevator actuation, wherein:

(a) the server communicates with the building controller over a mutually authenticated session and presents a time-limited, waypoint-bound access token bound to an ingress waypoint identifier and access time window;

(b) the robot confirms access via onboard sensing; and (c) the robot records the request, response, and timing in a secure-element-signed audit log.

20. A non-transitory computer-readable medium storing instructions which, when executed by processors of the server and the robotic unit, cause performance of the method of claim 14 including verifying a signature over the server-signed trip plan and performing the mutual attestation prior to enabling the hardware activation gate.

\* \* \* \* \*